(12) United States Patent
Rangarajan et al.

(10) Patent No.: US 7,623,501 B2
(45) Date of Patent: Nov. 24, 2009

(54) METHODS AND APPARATUS FOR RESOLVING ADDRESS MAPPING ASSOCIATED WITH A WIRELESS MESH NETWORK

(75) Inventors: Anand Rangarajan, Hillsboro, OR (US); W. Steven Conner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 11/139,265

(22) Filed: May 26, 2005

(65) Prior Publication Data
US 2006/0268766 A1 Nov. 30, 2006

(51) Int. Cl.
*H04Q 7/24* (2006.01)
(52) U.S. Cl. ............ 370/338; 370/392; 370/400; 455/418; 709/245
(58) Field of Classification Search ............ 370/338, 370/401, 254, 392, 352; 455/418; 709/245, 709/217
See application file for complete search history.

(56) References Cited

U.S. PATENT DOCUMENTS

| 6,717,944 | B1* | 4/2004 | Bryden et al. | 370/392 |
| 6,977,939 | B2* | 12/2005 | Joy et al. | 370/401 |
| 2002/0136225 | A1* | 9/2002 | Joy et al. | 370/401 |
| 2003/0088700 | A1* | 5/2003 | Aiken | 709/245 |
| 2003/0185149 | A1* | 10/2003 | Daniell et al. | 370/217 |
| 2005/0025129 | A1* | 2/2005 | Meier | 370/352 |
| 2005/0157732 | A1* | 7/2005 | Joy et al. | 370/401 |
| 2006/0023640 | A1* | 2/2006 | Chang et al. | 370/254 |

OTHER PUBLICATIONS

Connor, et al. "Methods and Apparatus for Distributing Link-State Information Associated With a Wireless Mesh Network", U.S. Appl. No. 11/025,612, filed Dec. 29, 2004.
Yarvis, et al, "Methods and Apparatus for Providing a Transparent Bridge Associated With a Wireless Mesh Network", U.S. Appl. No. 11/030,523, filed Jan. 5, 2005.

* cited by examiner

*Primary Examiner*—Danh C Le
(74) *Attorney, Agent, or Firm*—Schwabe, Williamson & Wyatt, P.C.

(57) ABSTRACT

Embodiments of methods and apparatus for resolving address mapping associated with a wireless mesh network are generally described herein. Other embodiments may be described and claimed.

29 Claims, 5 Drawing Sheets

METHODS AND APPARATUS FOR RESOLVING ADDRESS MAPPING ASSOCIATED WITH A WIRELESS MESH NETWORK

TECHNICAL FIELD

The present disclosure relates generally to wireless communication systems, and more particularly, to methods and apparatus for resolving address mapping associated with a wireless mesh network.

BACKGROUND

In a communication network, an address resolution protocol (ARP) may be used to identify a physical (hardware) address of a node (e.g., a Media Access Control (MAC) address) based on a high-level network address identifying that particular node (e.g., an Internet Protocol (IP) address). To transmit data to a recipient, for example, a sender may use ARP to dynamically map an IP address of the recipient to a corresponding MAC address. Typically, the sender may broadcast an ARP packet including the IP address of the recipient to all potential recipients of the communication network. The proper recipient may respond to the sender with the corresponding MAC address. Accordingly, the sender may transmit the data to the proper recipient. As wireless communication becomes more and more popular at offices, homes, schools, etc., however, the demand for resources by such broadcast transmission from the sender may cause congestions and/or slowdowns in wireless environments.

DETAILED DESCRIPTION

In general, methods and apparatus for resolving address mapping associated with a wireless mesh network are described herein. The methods and apparatus described herein are not limited in this regard.

Figure 1:
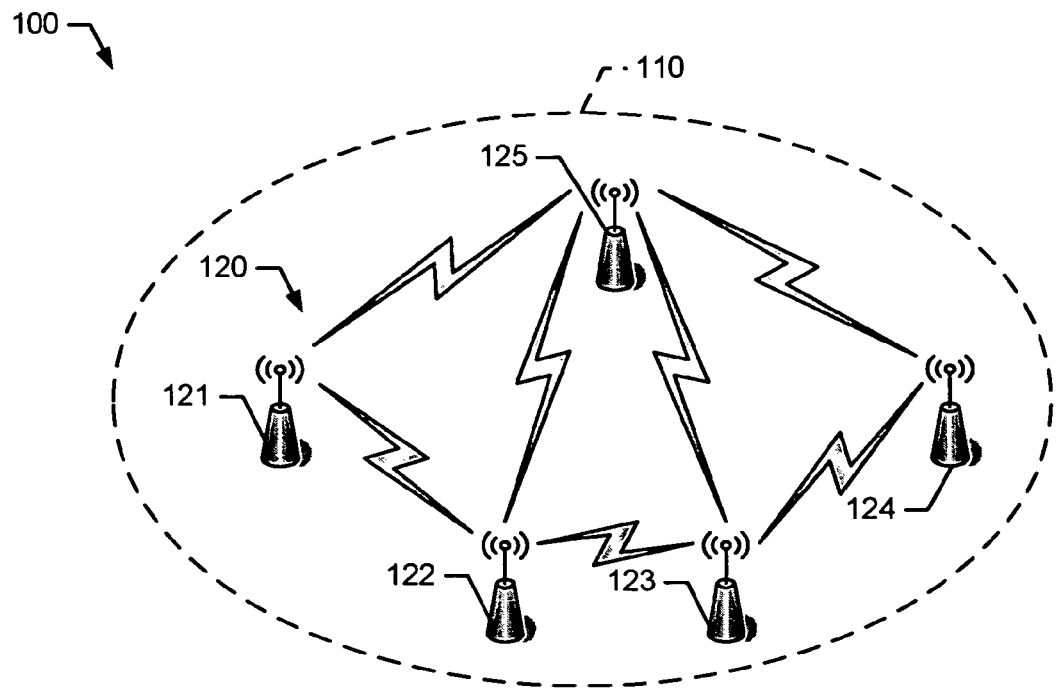
FIG. 1 is a schematic diagram representation of an example wireless communication system according to an embodiment of the methods and apparatus disclosed herein.

Referring to FIG. 1, an example wireless communication system 100 including a wireless mesh network 110 is described herein. In one example, the wireless mesh network 110 may be an extended service set (ESS) mesh network based on developments by the Institute of Electrical and Electronic Engineers (IEEE). The wireless mesh network 110 may include a plurality of mesh nodes 120, generally shown as 121, 122, 123, 124, and 125. Although FIG. 1 depicts five mesh nodes, the wireless mesh network 110 may include additional or fewer mesh nodes.

As described in detail below, the plurality of mesh nodes 120 may include access points, redistribution points, end points, and/or other suitable connection points for traffic flows via mesh paths having multiple hops. Accordingly, the wireless mesh network 110 may be implemented to provide a wireless personal area network (WPAN), a wireless local area network (WLAN), a wireless metropolitan area network (WMAN), a wireless wide area network (WWAN), and/or other suitable wireless communication networks.

The plurality of mesh nodes 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. In particular, the plurality of mesh nodes 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the short-range wireless communication links with each other. The plurality of mesh nodes 120 may also operate in accordance with other suitable wireless communication protocols that require very low power such as Bluetooth, Ultra Wideband (UWB), and/or radio frequency identification (RFID) to communicate with each other (e.g., forward data within the wireless mesh network 110).

Further, the wireless communication system 100 may include other WPAN, WLAN, WMAN, and/or WWAN devices (not shown) such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

While the methods and apparatus disclosed herein are described with respect to wireless mesh networks, the methods and apparatus disclosed herein may be applied to other suitable types of wireless communication networks. For example, the methods and apparatus disclosed herein may be applied to WPANs, WLANs, WMANs, WWANs, and/or broadband wireless access (BWA) networks.

Figure 2:
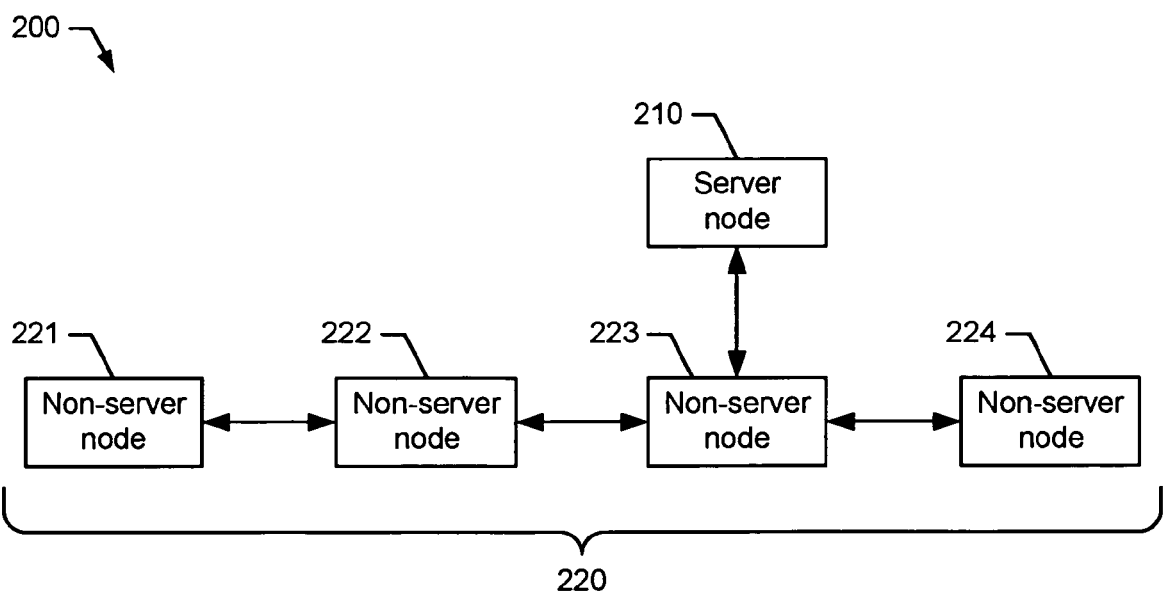
FIG. 2 is a block diagram representation of an example unicast address resolution protocol (UARP) system.

In the example of FIG. 2, an example unicast address resolution protocol (UARP) system 200 may include a server node 210 and one or more non-server nodes 220, generally shown as 221, 222, 223, and 224. The server node 210 and the non-server nodes 220 may form the wireless mesh network 110 as described above in connection with FIG. 1. Although FIG. 2 depicts one server node and four non-server nodes, the UARP system 200 may include other variations and/or combinations of server and non-server nodes. In one example, the UARP system 200 may include two or more server nodes. In another example, the UARP system 200 may include additional or fewer non-server nodes.

Any of one of the plurality of mesh nodes 120 of the wireless mesh network 110 of FIG. 1 may be configured to operate as the server node 210 of FIG. 2 with the remaining communication node(s) operating as non-server nodes 220. A dynamic host configuration protocol (DHCP) may be used to assign Internet Protocol (IP) addresses to the plurality of mesh nodes 120. The mesh node operating as a DCHP server may also be configured to operate as the UARP server node 210 to facilitate sharing of the address-mapping database between the DHCP and UARP services.

To populate the address-mapping database in the server node 210, each of the plurality of mesh nodes 120 may register an IP address and a Media Access Control (MAC) address with the server node 210. In one example, a mesh node may register an IP address and a MAC address associated with the mesh node during initialization (e.g., boot up). The mesh node may also register the IP address and the MAC address when the mesh node joins the wireless mesh network 110. A mesh node may also register the IP address and the MAC address in response to a change in the IP address and/or the MAC address of the mesh node.

In another example where the IP addresses may be assigned statically, the plurality of mesh nodes 120 of the wireless mesh network 110 of FIG. 1 may automatically select one of the plurality of mesh nodes 120 to operate as the server node 210. Alternatively, a network administrator may designate one of the plurality of mesh nodes 120 as the server node 210. Although the examples described above disclose designating one of the plurality of mesh nodes 120 as the server node 210, two or more of the plurality of mesh nodes 120 may be designated as server nodes 210. The methods and apparatus described herein are not limited in this regard.

While the methods and apparatus disclosed herein are described with respect to IP and MAC addresses, the methods and apparatus disclosed herein may be applied to other suitable types of protocol addresses. For example, the methods and apparatus disclosed herein may be implemented to map any type of network layer (e.g., Layer 3) address to any type of data-link layer (e.g., Layer 2) address.

Figures 3, 4:
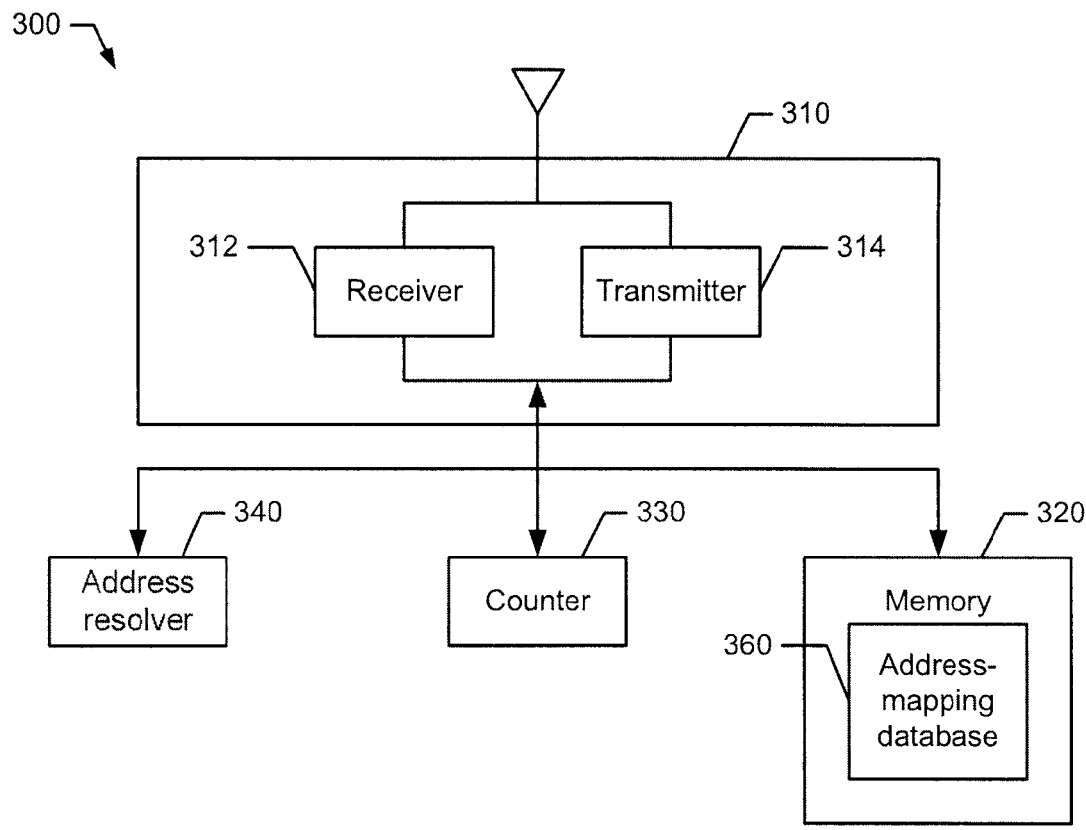
FIG. 3 is a block diagram representation of an example communication node of FIG. 2.
FIG. 4 depicts an example address-mapping table locally stored at a server node of FIG. 2.

Turning to FIG. 3, an example communication node 300 may include a communication interface 310, a memory 320, a counter 330, and an address resolver 340. The communication interface 310 may include a receiver 312 and a transmitter 314. The communication interface 310 may receive and/or transmit data associated with wireless communication networks including mesh networks (e.g., the wireless mesh network 110 of FIG. 1) and/or non-mesh networks. In particular, the receiver 312 may receive address requests/replies from other communication nodes within the same wireless communication network. The transmitter 314 may transmit address requests/replies to other communication nodes within the same wireless communication network.

The memory 320 may store address-mapping information. In particular, the memory 320 may include an address-mapping database 360. For example, the address-mapping database 360 may be an address resolution protocol (ARP) cache providing information to map IP addresses to MAC addresses of the plurality of mesh nodes 120 in the wireless mesh network 110. If the communication node 300 is configured to operate as a non-server node (e.g., any of the non-server nodes 220), entries may be added to the ARP cache for future reference when the communication node 300 processes an address request or reply.

If the communication node 300 is configured to operate as the server node (e.g., the server node 210 of FIG. 2), the address-mapping database 360 may include address-mapping information of the UARP system 200. For example, the address-mapping database 360 stored at the server node 210 may include an address-mapping table. In the example of FIG. 4, the address-mapping table 400 may include IP addresses 410 of each node of the UARP system 200. The address-mapping table 400 may also include MAC addresses 420 corresponding to each of the IP addresses 410. The methods and apparatus described herein are not limited in this regard.

Turning back to FIG. 3, the counter 330, and the address resolver 340 may be operatively coupled to the communication interface 310 and the memory 320. As described in detail below, the counter 330 may be configured to determine whether to continue operating in the UARP mode. Following the above example, the communication node 300 may disable the UARP mode if the counter 330 is greater than a time threshold for the communication node 300 to receive an address reply from the server node 210. As a result, the communication node 300 may proceed to use an ARP mechanism to process the IP address of the destination node to identify a corresponding MAC address.

The address resolver 340 may be configured to identify the protocol address of the destination node based on the address-mapping information stored in the memory 320. Following the above example again, the communication node 300 may receive the address-mapping information to communicate with the destination node in a unicast address reply from the server node 210. In particular, the address resolver 340 may identify a MAC address corresponding to the IP address of the destination node. Thus, the communication node 300 may determine the corresponding MAC address based on the IP address of the destination node without using broadcast transmission.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). The methods and apparatus described herein are not limited in this regard.

Figure 5:
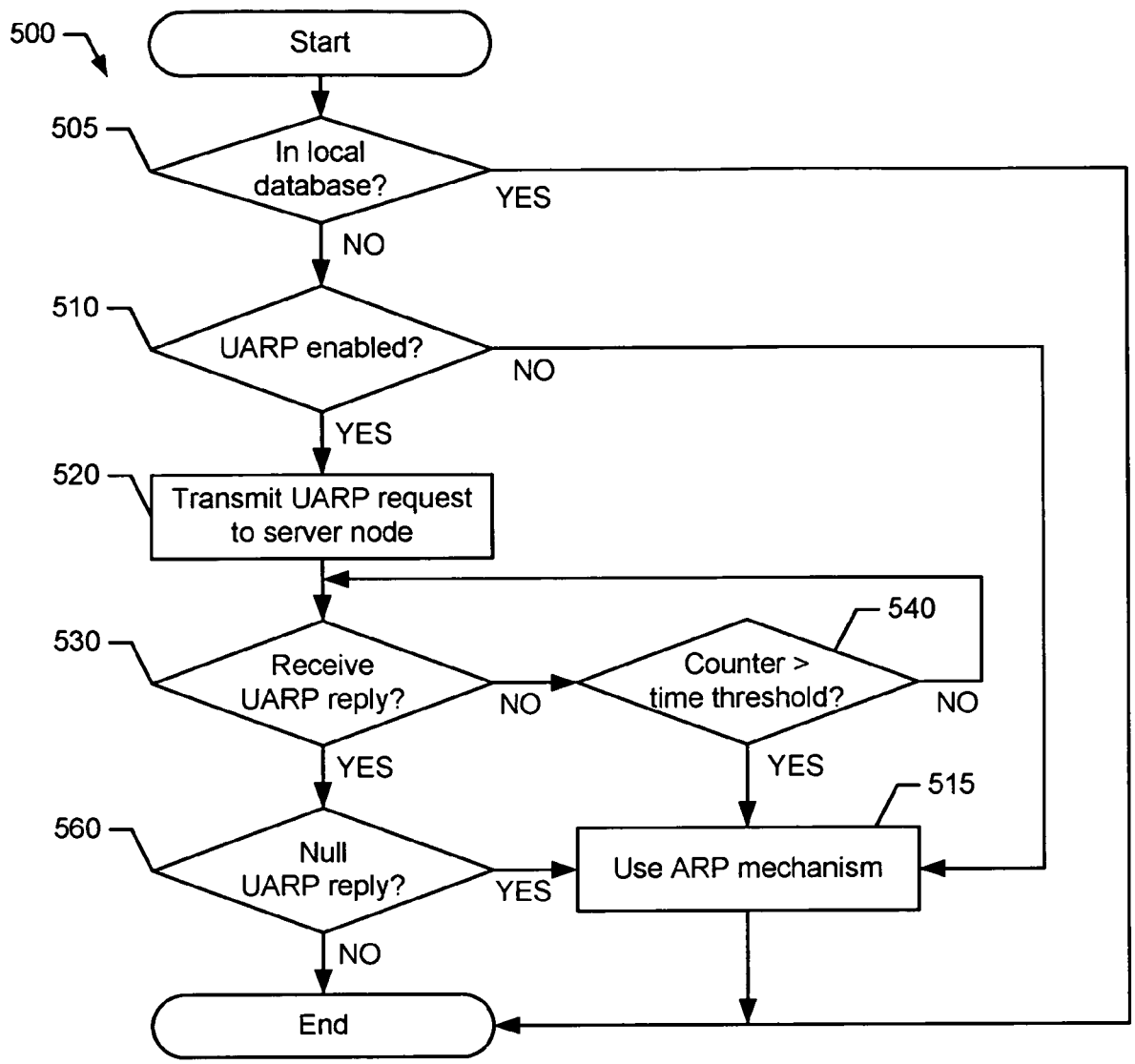
FIG. 5 is a flow diagram representation of one manner in which an example communication node of FIG. 3 may be configured to resolve address mapping associated with a wireless mesh network.

FIG. 5 depicts one manner in which the example communication node 300 of FIG. 3 may be configured to resolve address mapping associated with a wireless mesh network. The example process 500 of FIG. 5 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 5, these actions can be performed in other temporal sequences. Again, the example process 500 is merely provided and described in conjunction with the apparatus of FIGS. 2 and 3 as an example of one way to configure a mesh node to resolve address mapping associated with a wireless mesh network.

To communicate with a destination node, a source node may need to identify a protocol address of the destination node if an address-mapping database (e.g., the database 360) of the source node fails to provide the necessary address-mapping information. In the example of FIG. 5, the process 500 may begin determining whether address-mapping information to identify a protocol address of the destination node is stored in a local address-mapping database (block 505). If the local address-mapping database includes address-mapping information to identify a protocol address of the destination node, the process 500 may terminate.

Otherwise if the local address-mapping database does not include address-mapping information to identify the protocol address of the destination node, the communication node 300 may determine whether UARP is enabled (block 510). For example, UARP may be manually enabled by a network administrator and/or automatically enabled. If UARP is not enabled, the communication node 300 may proceed to block 515 to use a broadcast transmission mechanism (e.g., ARP) to identify the address of the destination node as described in connection with FIG. 6.

Figure 6:
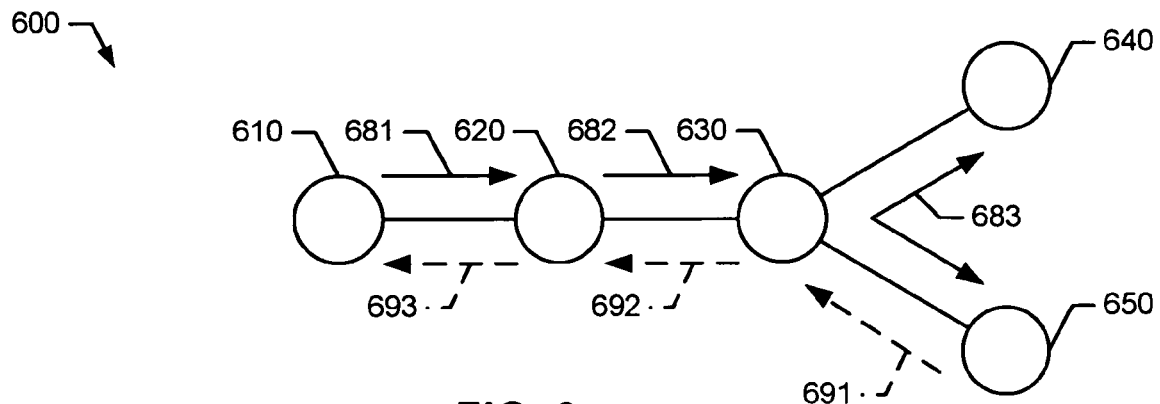
FIG. 6 depicts an example wireless mesh network operating in accordance with address resolution protocol.

Referring to FIG. 6, for example, a wireless mesh network 600 may include a plurality of mesh nodes, generally shown as 610, 620, 630, 640, and 650. The wireless mesh network 600 may operate in accordance with a broadcast transmission mechanism such as ARP. In one example, the mesh node 610 may operate as the source node and the mesh node 650 may operate as the destination node with the mesh nodes 620, 630, and 640 operating as intermediate and/or neighboring nodes. To communicate with the destination node 650, the source node 610 may need to identify a MAC address of the destination node 650 based on the IP address of the destination node 650. Accordingly, the source node 610 may transmit an address request via a broadcast transmission to neighboring node(s) of the source node 610 such as the intermediate node 620 (e.g., an ARP request).

If a neighboring node of the source node 610 is not the destination node 650, that neighboring node may propagate the ARP request to other mesh node(s) of the wireless mesh network 600 in response to receipt of the ARP request. The other mesh node(s) may further propagate the ARP request until the ARP request reaches the destination node 650. For example, the source node 610 may transmit an ARP request via a broadcast transmission (e.g., shown as solid lines 681, 682, and 683) to neighboring node(s) relative to the source node 610 such as the intermediate node 620 (solid line 681). In turn, the intermediate node 620 may further propagate the ARP request to neighboring node(s) relative to the intermediate node 620 such as the intermediate node 630 (solid line 682). In a similar manner, the intermediate node 630 may propagate the ARP request to neighboring node(s) relative to the intermediate node 630 such as the mesh node 640 and the destination node 650 (solid line 683). As a result, the wireless mesh network 600 may require three broadcast transmissions (e.g., solid lines 681, 682, and 683) to process the ARP request.

In response to receipt of the ARP request, the destination node 650 may transmit an ARP reply to the source node 610 via a unicast transmission (e.g., shown as dash lines 691, 692, and 693). The destination node 650 may transmit the ARP reply to the intermediate node 630 (dash line 691), which in turn, may forward the ARP reply to the intermediate node 620 (dash line 692). In a similar manner, the intermediate node 620 may forward the ARP reply to the source node 610 (dash line 693). The ARP reply may include the MAC address of the destination node 650 so that the source node 610 may identify the MAC address corresponding to the IP address of the destination node 650 to communicate with the destination node 650. The methods and apparatus described herein are not limited in this regard.

Figure 7:
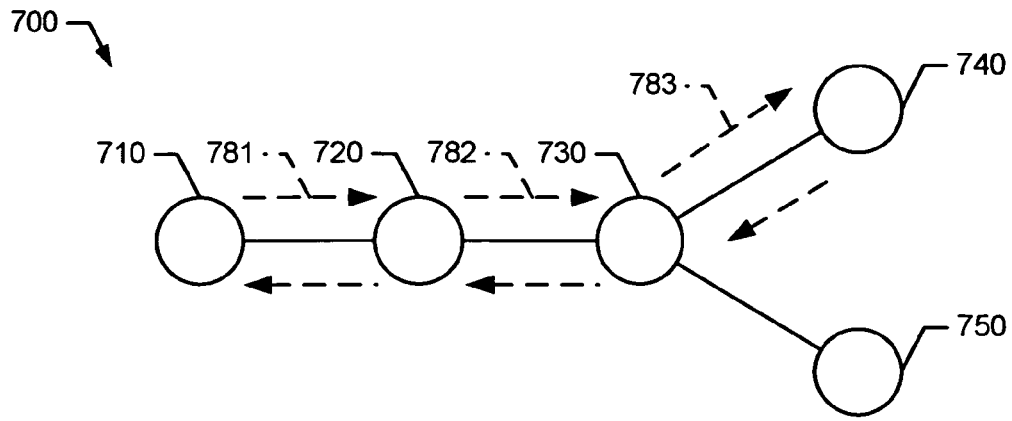
FIG. 7 depicts an example wireless mesh network operating in accordance with UARP.

Turning back to block 510, if UARP is enabled, the communication node 300 may transmit an address request to a server node (e.g., the server node 210 of FIG. 2) via a unicast transmission (e.g., an UARP request) (block 520). Referring to FIG. 7, for example, a wireless mesh network 700 may include a plurality of mesh nodes, generally shown as 710, 720, 730, 740, and 750. The wireless mesh network 700 may operate in accordance with a unicast transmission mechanism such as UARP. In one example, the mesh node 710 may operate as the source node, the mesh node 750 may operate as the destination node, and the mesh node 740 may operate as the server node with the mesh nodes 720 and 730 operating as intermediate nodes. To communicate with the destination node 750, the source node 710 may need to identify a MAC address of the destination node 750 based on the IP address of the destination node 750. Accordingly, the source node 710 may transmit an address request via a unicast transmission (e.g., shown as dash lines 781, 782, and 783) to the server node 740 (e.g., an UARP request). In particular, the source node 710 may transmit the UARP request to the intermediate node 720 (dash line 781), which in turn, may forward the UARP request to the intermediate node 730 (dash line 782). Accordingly, the intermediate node 730 may forward the UARP request to the server node 740 (dash line 783). As a result, the UARP request may processed by the wireless mesh network 700 without broadcast transmission.

By using unicast transmission instead of broadcast transmission, the UARP request of FIG. 7 may conserve more resources in a wireless environment relative to, for example, the ARP request as described in connection with FIG. 6. For example, the UARP request may be processed relatively faster than the ARP request because unicast packets may be transmitted at a data rate faster than a data rate that may be used to transmit broadcast packets. The UARP request may also use less bandwidth than the ARP request. In addition, communication nodes of a wireless communication network may acknowledge receipt of unicast transmissions such as the UARP request. Further, broadcast transmissions such as the ARP request may cause collision to occur because a broadcast packet is not directed to any particular receiver. As a result, the communication nodes may not be able to reserve a wireless medium before the broadcast transmission. In contrast, the communication nodes may use handshaking mechanisms such as ready-to-send (RTS)/clear-to-send (CTS) to reserve a wireless medium for unicast transmission. The methods and apparatus described herein are not limited in this regard.

Turning back to FIG. 5, the communication node 300 (e.g., via the address resolver 340) may monitor for an UARP reply from the server node 210 (block 530). Following the above example described in connection with FIG. 7, the server node 740 may transmit an UARP reply to the source node 610 via a unicast transmission (e.g., shown as dash lines 791, 792, and 793). In one example, the server node 740 may transmit the UARP reply to the intermediate node 730 via a unicast transmission (dash line 791), which in turn, may forward the ARP reply to the intermediate node 720 via a unicast transmission (dash line 792). In a similar manner, the intermediate node 720 may forward the UARP reply to the source node 710 via a unicast transmission (dash line 793). The UARP reply may include address-mapping information used by the source node 710 to identify a protocol address of the destination node 750. For example, the server node 740 may use a locally-stored address-mapping database (e.g., via the address-mapping table 400 of FIG. 4) to identify the MAC address corresponding to the IP address of the destination node 750.

If the communication node 300 fails to receive an UARP reply at block 530, the communication node 300 may determine whether the counter 330 is greater than a time threshold to receive an UARP reply from the server node 210 (block 540). In one example, the time threshold may be pre-defined as 500 milliseconds (ms). If the counter 330 is less than or equal to the time threshold, the communication node 300 may return to block 530 to continue to monitor for an UARP reply. Otherwise, if the counter 330 is greater than the time threshold, the communication node 300 may proceed to block 515 to use an ARP mechanism to process the IP address of the destination node as described above in connection with FIG. 6.

Turning back to block 530, if the communication node 300 receives an UARP reply, the communication node 300 may determine whether the UARP reply includes a null MAC address (e.g., a null UARP reply) (block 560). In particular, a null MAC address may include all zero-bits (e.g., 00:00:00:00:00:00). Following the above example described in connection with FIG. 7 again, if the server node 740 is unable to resolve and/or identify the IP address of the destination node 750, the server node 740 may transmit a null UARP reply to the source node 710. If the communication node 300 determines that the UARP reply is a null UARP reply at block 560, the communication node 300 may proceed to block 515 to use an ARP mechanism to identify the IP address of the destination node as described above in connection with FIG. 6. Otherwise if the communication node 300 determines at block 560 that the UARP reply is not a null UARP reply, the process 500 may terminate. Thus, the UARP system 200 may resolve an address query without using broadcast transmission. The methods and apparatus described herein are not limited in this regard.

Although the above examples are described with respect to wireless communication networks including communication nodes that support the UARP mode, the methods and apparatus disclosed herein are readily applicable to wireless communication networks including communication nodes that do not support the UARP mode (e.g., legacy mesh nodes). If an address-mapping database of a non-legacy node communicatively coupled to a legacy node includes the address-mapping information needed by the legacy node to communicate with a destination node, the non-legacy node may operate in the UARP mode to process the address request from the legacy node. For example, the non-legacy node may transmit a reply including the necessary address-mapping information to the legacy node via a unicast transmission in response to an address request from the legacy node. Accordingly, the legacy node may communicate with the destination node based on the address-mapping information from the non-legacy node.

Figure 8:
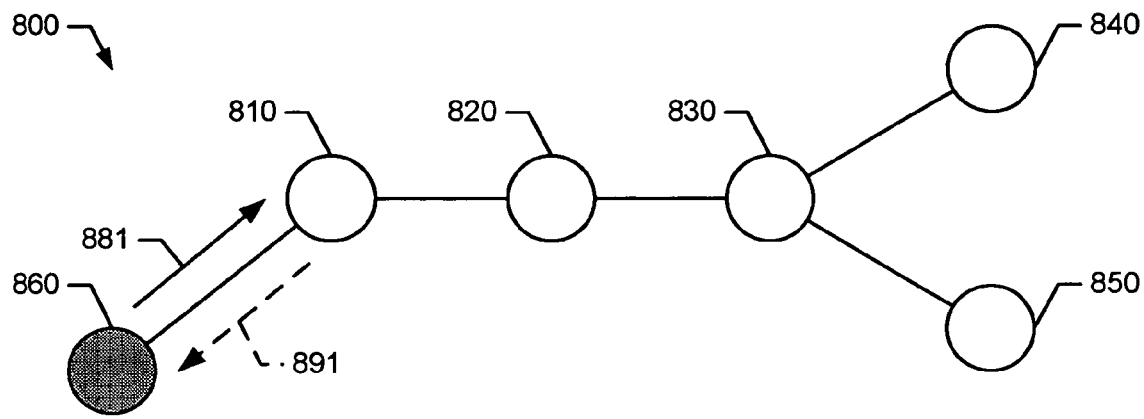
FIG. 8 depicts another example wireless mesh network operating in accordance with UARP.

Referring to FIG. 8, for example, a wireless mesh network 800 may include a plurality of mesh nodes, generally shown as 810, 820, 830, 840, 850, and 860. In one example, the legacy node 860 may operate as the source node, the non-legacy node 850 may operate as the destination node, and the non-legacy node 840 may operate as the server node with the mesh nodes 810, 820, and 830 operating as intermediate nodes.

To communicate with the destination node 850, the source node 860 may need to identify a MAC address of the destination node 850 based on the IP address of the destination node 850. Accordingly, the source node 860 may transmit an address request via a broadcast transmission to neighboring node(s) of the source node 860 such as the intermediate node 810 (e.g., an ARP request). In particular, the source node 860 may transmit the ARP request to the intermediate node 810 via a broadcast transmission (e.g., shown as a solid line 881). Instead of propagating the ARP request from the source node 860 to neighboring node(s) relative to the intermediate node 810 such as the intermediate node 820, the intermediate node 810 may operate in the UARP mode.

The intermediate node 810 may transmit an UARP reply to the source node 860 via a unicast transmission (e.g., shown as a dash line 891) if the address-mapping database of the intermediate node 810 includes the address-mapping information needed by the source node 860 to communicate with the destination node 850. In one example, the intermediate node 810 may have previously received and stored the MAC address of the destination node 850 in a local address-mapping database. As a result, the intermediate node 810 may limit broadcast transmission from the source node 860 by directly providing the source node 860 with the MAC address of the destination node 850. The methods and apparatus described herein are not limited in this regard.

If an address-mapping database of a non-legacy node communicatively coupled to a legacy node fails to include the address-mapping information needed by the legacy node to communicate with a destination node, the non-legacy node may operate in the UARP mode to process the address request from the legacy node. Accordingly, the non-legacy node may forward the necessary address-mapping information to the legacy node.

Figure 9:
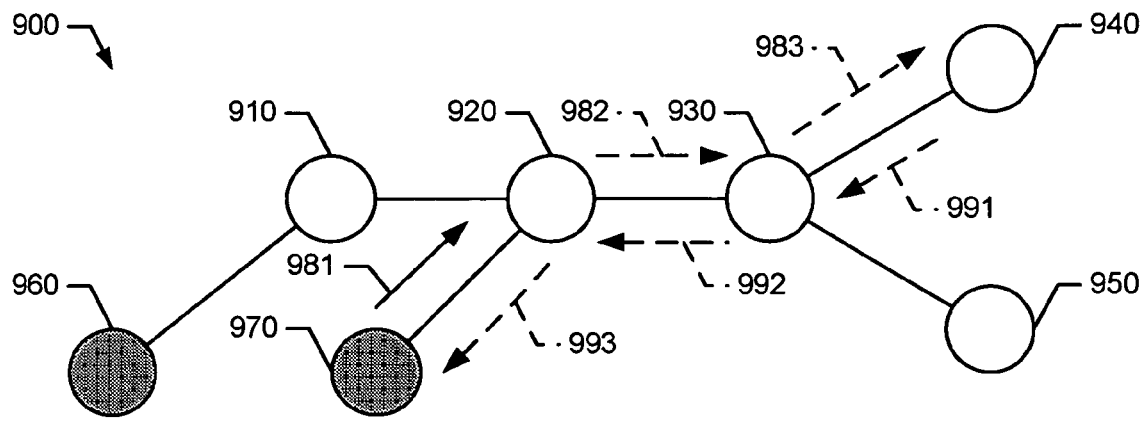
FIG. 9 depicts yet another example wireless mesh network operating in accordance with UARP.

In the example of FIG. 9, a wireless mesh network 900 may include a plurality of mesh nodes, generally shown as 910, 920, 930, 940, 950, 960, and 970. In one example, the legacy node 970 may operate as the source node, the non-legacy node 950 may operate as the destination node, and the non-legacy node 940 may operate as the server node with the mesh nodes 920 and 930 operating as intermediate nodes.

To communicate with the destination node 950, the source node 970 may need to identify a MAC address of the destination node 950 based on the IP address of the destination node 950. Accordingly, the source node 970 may transmit an address request via a broadcast transmission to neighboring node(s) of the source node 970 such as the intermediate node 920 (e.g., an ARP request). In particular, the source node 970 may transmit the ARP request to the intermediate node 920 via a broadcast transmission (e.g., shown as a solid line 981). Instead of propagating the ARP request from the source node 970 to neighboring node(s) relative to the intermediate node 920 such as the intermediate node 930, the intermediate node 920 may determine whether an address-mapping database locally stored at the intermediate node 920 includes address-mapping information associated with the destination node 950.

If the local address-mapping database at the intermediate node 920 does not include the address-mapping information associated with the destination node 950, the intermediate node 920 may operate in the UARP mode. For example, the intermediate node 920 may transmit an UARP request to the intermediate node 930 via a unicast transmission (e.g., shown as a dash line 982). In turn, the intermediate node 930 may forward the UARP request to the server node 940 via a unicast transmission (e.g., shown as a dash line 983).

In response to the UARP request, the server node 940 may transmit an UARP reply to the source node 610 via a unicast transmission (e.g., generally shown as dash lines 991, 992, and 993). In particular, the server node 940 may transmit the UARP reply to the intermediate node 930 (dash line 991), which in turn, may forward the ARP reply to the intermediate node 920 (dash line 992). In a similar manner, the intermediate node 920 may forward the UARP reply to the source node 970 (dash line 993). Accordingly, the source node 970 may use the address-mapping information of the UARP reply to identify a protocol address of the destination node 950. As a result, the intermediate node 920 may limit broadcast transmission from the source node 970 by operating in the UARP mode to identify the MAC address of the destination node 950. The methods and apparatus described herein are not limited in this regard.

Although the methods and apparatus disclosed herein are described with respect to wireless mesh networks (e.g., an ESS mesh network), the methods and apparatus disclosed herein are readily applicable to other wireless communication networks. For example, the methods and apparatus disclosed herein may be applied to non-mesh infrastructure networks such as a basic service set network including station(s) and access point(s). Further, while the methods and apparatus disclosed herein are described with respect to Layer 2 and Layer 3 addresses, the methods and apparatus disclosed herein may be applied to other suitable types of protocol addresses.

Figure 10:
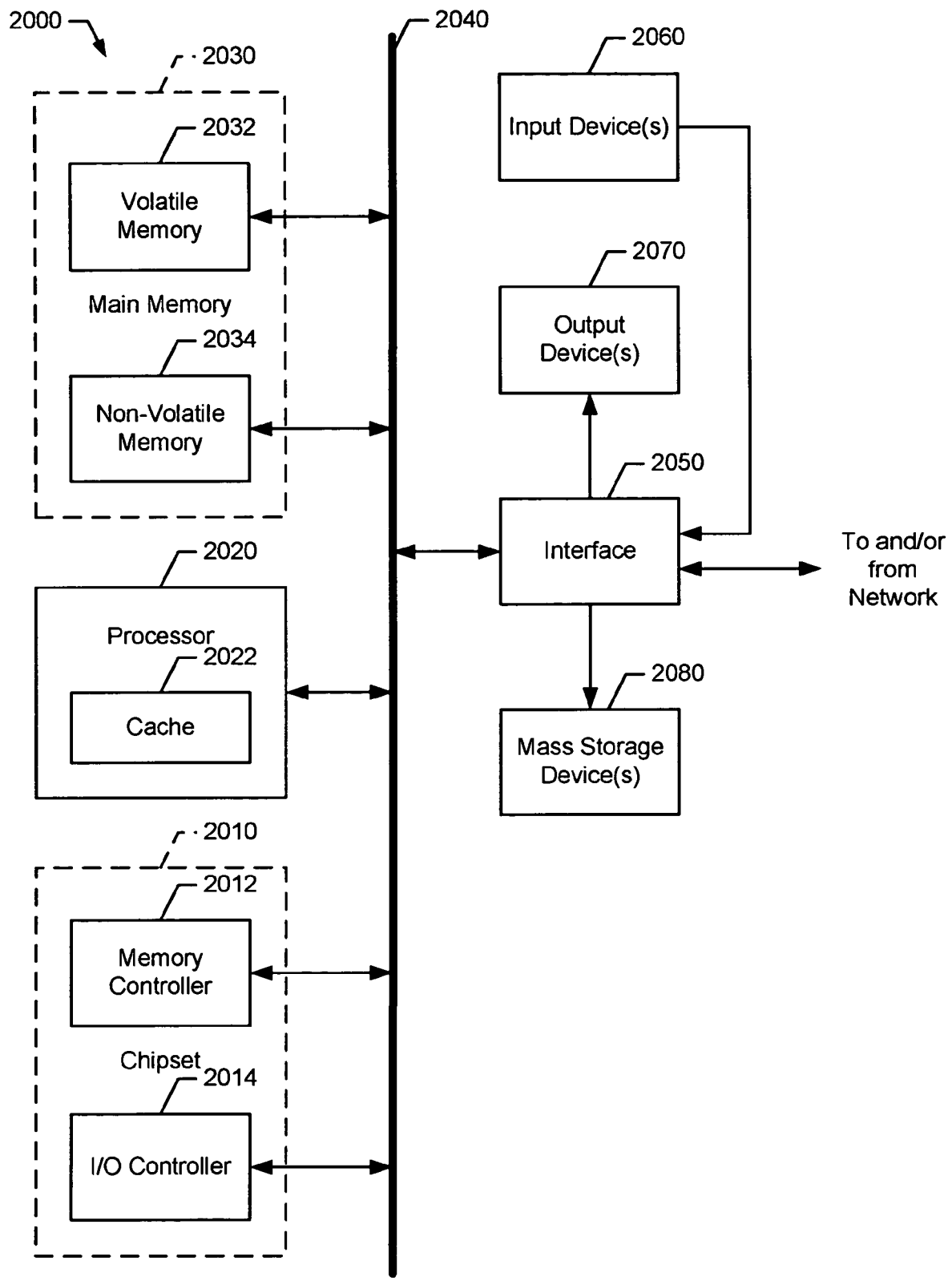
FIG. 10 is a block diagram representation of an example processor system that may be used to implement the example communication node of FIG. 3.

FIG. 10 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 10 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 10 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   transmitting, by a transmitter, a unicast address resolution protocol (UARP) request from a first communication node to a second communication node via a unicast transmission, the UARP request including a first protocol address associated with a third communication node; and identifying, by an address resolver, a second protocol address associated with the third communication node at the first communication node based on address-mapping information from the second communication node, the second protocol address corresponding to the first protocol address associated with the third communication node, wherein the first communication node comprises a source node, wherein the third communication node comprises a destination node to communicate with the source node, and wherein the second communication node comprises a server node to provide a protocol address associated with the destination node to the source node, and wherein at least one of the first, second, or third communication nodes is associated with a wireless communication network.

2. A method as defined in claim 1, wherein transmitting the UARP request from the first communication node to the second communication node via a unicast transmission comprises transmitting a UARP request that includes a protocol address associated with the destination node, and wherein the server node includes an address-mapping database associated with a wireless mesh network.

3. A method as defined in claim 1, wherein transmitting the UARP request from the first communication node to the second communication node via a unicast transmission comprises transmitting a UARP request including an Internet Protocol address associated with the third communication node via a unicast transmission.

4. A method as defined in claim 1, wherein identifying the second protocol address associated with the third communication node at the first communication node based on the address-mapping information from the second communication node comprises identifying a protocol address associated with destination node at the source node in response to receipt of an address reply including the address-mapping information from the server node via a unicast transmission.

5. A method as defined in claim 1, wherein identifying the second protocol address associated with the third communication node at the first communication node based on the address-mapping information from the second communication node comprises identifying a Media Access Control address associated with the third communication node.

6. A method as defined in claim 1 further comprising transmitting a registration from a non-server node to the server node having an address-mapping database associated with one or more non-server nodes, the registration including an Internet Protocol address and a Media Access Control address associated with the non-server node.

7. A method as defined in claim 1 further comprising receiving an address resolution protocol request from a legacy node at the first communication node via a broadcast transmission and transmitting an address resolution protocol reply including address-mapping information to the legacy node from the first communication node via a unicast transmission.

8. A method as defined in claim 1 further comprising transmitting an address resolution protocol (ARP) request from the first communication node via a broadcast transmission to identify the second protocol address associated with the third communication node in response to receipt of a null address reply from the second communication node.

9. A method as defined in claim 1, further comprising:
transmitting an address resolution protocol (ARP) request via a broadcast transmission in the event a reply to the UARP request is not received in a predetermined period of time.

10. An article of manufacture having instructions stored thereon that, if executed, cause a machine to:

transmit a unicast address resolution protocol (UARP) request from a first communication node to a second communication node via a unicast transmission, the UARP request including a first protocol address associated with a third communication node; and identify a second protocol address associated with the third communication node at the first communication node based on address-mapping information from the second communication node, the second protocol address corresponding to the first protocol address associated with the third communication node, wherein the first communication node comprises a source node, wherein the third communication node comprises a destination node to communicate with the source node, and wherein the second communication node comprises a server node to provide a protocol address associated with the destination node to the source node, and wherein at least one of the first, second, or third communication node is associated with a wireless communication network.

11. An article of manufacture as defined in claim 10, wherein the instructions, if executed, cause the machine to transmit the UARP request from the first communication node to the second communication node via a unicast transmission, wherein the UARP request includes a protocol address associated with the destination node, and wherein the server node includes an address-mapping database associated with a wireless mesh network.

12. An article of manufacture as defined in claim 10, wherein the instructions, if executed, cause the machine to transmit the UARP request from the first communication node to the second communication node via a unicast transmission by transmitting a UARP request including an Internet Protocol address associated with the third communication node via a unicast transmission.

13. An article of manufacture as defined in claim 10, wherein the instructions, if executed, cause the machine to identify the second protocol address associated with the third communication node at the first communication node based on the address-mapping information from the second communication node by identifying a protocol address associated with the destination node at the source node in response to receipt of an address reply including the address-mapping information from the server node via a unicast transmission.

14. An article of manufacture as defined in claim 10, wherein the instructions, if executed, cause the machine to identify the second protocol address associated with the third communication node at the first communication node based on the address-mapping information from the second communication node by identifying a Media Access Control address associated with the third communication node.

15. An article of manufacture as defined in claim 10, wherein the instructions, if executed, cause the machine to receive an address resolution protocol request from a legacy node at the first communication node via a broadcast transmission and transmit an address resolution protocol reply including address-mapping information to the legacy node from the first communication node via a unicast transmission.

16. An apparatus comprising:
a communication interface to transmit a unicast address resolution protocol (UARP) request from a first communication node to a second communication node via a unicast transmission, the UARP request including a first protocol address associated with a third communication node; and an address resolver coupled to the communication interface to identify a second protocol address associated with the third communication node at the first communication node based on address-mapping information from the second communication node, the second protocol address corresponding to the first protocol address associated with the third communication node, wherein the first communication node comprises a source node, wherein the third communication node comprises a destination node to communicate with the source node, and wherein the second communication node comprises a server node to provide a protocol address associated with the destination node to the source node, and wherein at least one of the first, second, or third communication nodes is associated with a wireless communication network.

17. An apparatus as defined in claim 16, wherein the server node has an address-mapping database associated with the wireless mesh network.

18. An apparatus as defined in claim 16, wherein the UARP request comprises at least one of an Internet Protocol address associated with the first communication node, a Media Access Control address associated with the first communication node, or an Internet Protocol address associated with the third communication node.

19. An apparatus as defined in claim 16, wherein the address reply comprises a Media Access Control address associated with the third communication node.

20. An apparatus as defined in claim 16, wherein the address resolver is configured to initiate transmission of an address resolution protocol (ARP) from the first communication node via a broadcast transmission to identify the second protocol address associated with the third communication node in response to receipt of a null address reply from the second communication node.

21. An apparatus as defined in claim 16, wherein the communication interface is configured to receive an address resolution protocol request from a legacy node at the first communication node via a broadcast transmission and transmit an address resolution protocol reply including address-mapping information to the legacy node from the first communication node via a unicast transmission.

22. An apparatus as defined in claim 16 further comprising an address-mapping database including the address-mapping information.

23. A system comprising:
a flash memory; and
a processor coupled to the flash memory to transmit a unicast address resolution protocol (UARP) request from a first communication node to a second communication node via a unicast transmission, and to identify a protocol address associated with a third communication node at the first communication node based on address-mapping information from the second communication node, wherein the first communication node comprises a source node, wherein the third communication node comprises a destination node to communicate with the source node, and wherein the second communication node comprises a server node to provide a protocol address associated with the destination node to the source node, and wherein at least one of the first, second, or third communication nodes is associated with a wireless communication network.

24. A system as defined in claim 23, wherein the server node has an address-mapping database associated with the wireless mesh network.

25. A system as defined in claim 23, wherein the UARP request comprises at least one of an Internet Protocol address associated with the first communication node, a Media Access Control address associated with the first communication node, or an Internet Protocol address associated with the third communication node.

26. A system as defined in claim 23, wherein the address reply comprises a Media Access Control address associated with the third communication node.

27. A system as defined in claim 23, wherein the processor is configured to transmit an address resolution protocol (ARP) request from the first communication node via a broadcast transmission to identify the second protocol address associated with the third communication node in response to receipt of a null address reply from the second communication node.

28. A system as defined in claim 23, wherein the processor is configured to receive an address resolution protocol request from a legacy node at the first communication node via a broadcast transmission and transmit an address resolution protocol reply including address-mapping information to the legacy node from the first communication node via a unicast transmission.

29. A system as defined in claim 23, wherein the flash memory comprises an address-mapping database including address-mapping information associated with the wireless communication network.

* * * * *

UNITED STATES PATENT AND TRADEMARK OFFICE
CERTIFICATE OF CORRECTION

PATENT NO.        : 7,623,501 B2                                        Page 1 of 1
APPLICATION NO. : 11/139265
DATED             : November 24, 2009
INVENTOR(S)       : Rangarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twenty-sixth Day of October, 2010

David J. Kappos
*Director of the United States Patent and Trademark Office*